US008978046B2

(12) United States Patent
Faludi

(10) Patent No.: US 8,978,046 B2
(45) Date of Patent: Mar. 10, 2015

(54) INTERACTION BETWEEN APPLICATIONS BUILT ON DIFFERENT USER INTERFACE TECHNOLOGIES

(75) Inventor: Gabor Faludi, Mannheim (DE)

(73) Assignee: Business Objects Software Limited, Dublin (IE)

( * ) Notice: Subject to any disclaimer, the term of this patent is extended or adjusted under 35 U.S.C. 154(b) by 377 days.

(21) Appl. No.: 13/165,810

(22) Filed: Jun. 22, 2011

(65) Prior Publication Data

US 2012/0331481 A1 Dec. 27, 2012

(51) Int. Cl.
- *G06F 3/00* (2006.01)
- *G06F 9/44* (2006.01)
- *G06F 9/46* (2006.01)
- *G06F 13/00* (2006.01)
- *G06F 9/54* (2006.01)

(52) U.S. Cl.
CPC .......... *G06F 9/542* (2013.01); *G06F 2209/545* (2013.01)
USPC ............ 719/318; 719/313; 719/320; 715/700

(58) Field of Classification Search
None
See application file for complete search history.

(56) References Cited

U.S. PATENT DOCUMENTS

| 6,421,740 | B1 * | 7/2002 | LeCroy ......................... 719/331 |
| 8,005,943 | B2 * | 8/2011 | Zuzga et al. .................. 709/224 |
| 2006/0230152 | A1 * | 10/2006 | Matsushima ................. 709/226 |
| 2008/0208806 | A1 * | 8/2008 | Dalfo et al. ....................... 707/3 |
| 2009/0118013 | A1 * | 5/2009 | Finnimore et al. .............. 463/42 |
| 2011/0239103 | A1 * | 9/2011 | Mercuri ......................... 715/234 |

* cited by examiner

*Primary Examiner* — Craig Dorais

(57) ABSTRACT

Various embodiments of systems and methods for interaction between applications built on different technologies are described herein. In one aspect, at least one action handler of a number of action handlers is associated with at least one application from a number of applications participating in the integrated scenario. In another aspect, at a first action handler that is associated with a source application, a request to access a target application is received. An identifier of the target application is retrieved and based on that identifier a second action handler associated with the target application is invoked, where the identifier of the target application is registered with the second action handler. The target application is launched by the second action handler in response to the received request.

19 Claims, 8 Drawing Sheets

INTERACTION BETWEEN APPLICATIONS BUILT ON DIFFERENT USER INTERFACE TECHNOLOGIES

BACKGROUND

Almost every large enterprise uses various computer applications to automate its activities. Often, such different applications implement different User Interface (UI) technologies, e.g. eXtensible HyperText Markup Language (XHTML), Web Dynpro ABAP® developed by SAP AG, Flash® originally developed by Macromedia Inc., Flex® provided by Adobe Systems Inc., JavaScript® developed by Netscape Communications Corp., etc., running on different platforms, e.g., Java® Platform originally provided by Sun Microsystems Inc., .Net® Framework provided by Microsoft Corp, Adobe Integrated Runtime® cross-platform provided by Adobe Systems Inc., etc. In many cases, there is a need to integrate these applications for executing different tasks or business processes. Integration of applications may require integration on UI level to allow users to interact with the different applications.

Integration of applications based on different UI technologies would require employing different tools for communication between the applications. An example of such tools is a Flash® JavaScript® bridge for communication between Flex®-based and Hyper Text Markup Language (HTML) based applications, ActiveX® controls provided by Microsoft Corp, etc. Furthermore, when adding a new application built on different UI technology to a group of integrated applications, additional integration tools may need to be employed. Thus, the number of tools needed to build and support UI integration grows. Integration is performed in an unstructured manner, tools are deployed in an ad hoc basis, resulting in a disorganized grid that makes navigation and interaction between applications inefficient and difficult to maintain.

SUMMARY

Various embodiments of systems and methods for interaction between applications built on different user interface technologies are described herein. In one aspect, at least one action handler is associated with an application from a group of applications. A request for accessing a target application is received at a first action handler associated with a source application. A target identifier of the target application is retrieved based on the request. In another aspect, a second action handler associated with the target application is invoked, where the target identifier is registered with the second action handler. The second action handler launches the target application in response to the request.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for interaction between applications built on different user interface technologies are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In an enterprise, a common use case is integration of several different applications in a given scenario to enhance the set of available services and functionalities. Typically, these applications are built on different platforms and UI technologies. For example, such integrated scenario may involve SAP Strategy Management (SSM) application part of the Enterprise Performance Management (EPM) framework, and Risk Management (RM) application part of the Governance, Risk and Compliance (GRC) application. On one hand, the SSM application may be developed in C/C++/C# or Visual Basic programming languages in the .NET® Framework, with Flex® or Excel® plug-ins based UI. On the other hand, the UI of the RM application may be based on Web Dynpro ABAP®. The RM application deals with management, identification and assessment of risks within a given organization. The SSM application enables organizations to define strategic goals, and then measures and manages performance (for example, by setting Key Performance Indicators (KPIs)) against those goals. A possible use case may involve defining KPIs for maintaining certain risk level below a given threshold. Integration of applications may allow users to manage risks within the RM application while monitoring the corresponding KPIs from the SSM application.

Navigation and interaction between applications built on different UI technologies requires interoperability at the UI level. In one embodiment, action handlers allow for navigation, access or other interaction between different UI technologies, thus ensuring interoperability. Functionalities provided by applications built on different UI technologies are accessible by a user through an integrated interface. A single point of access to multiple applications on UI level is enabled.

Figure 1A:
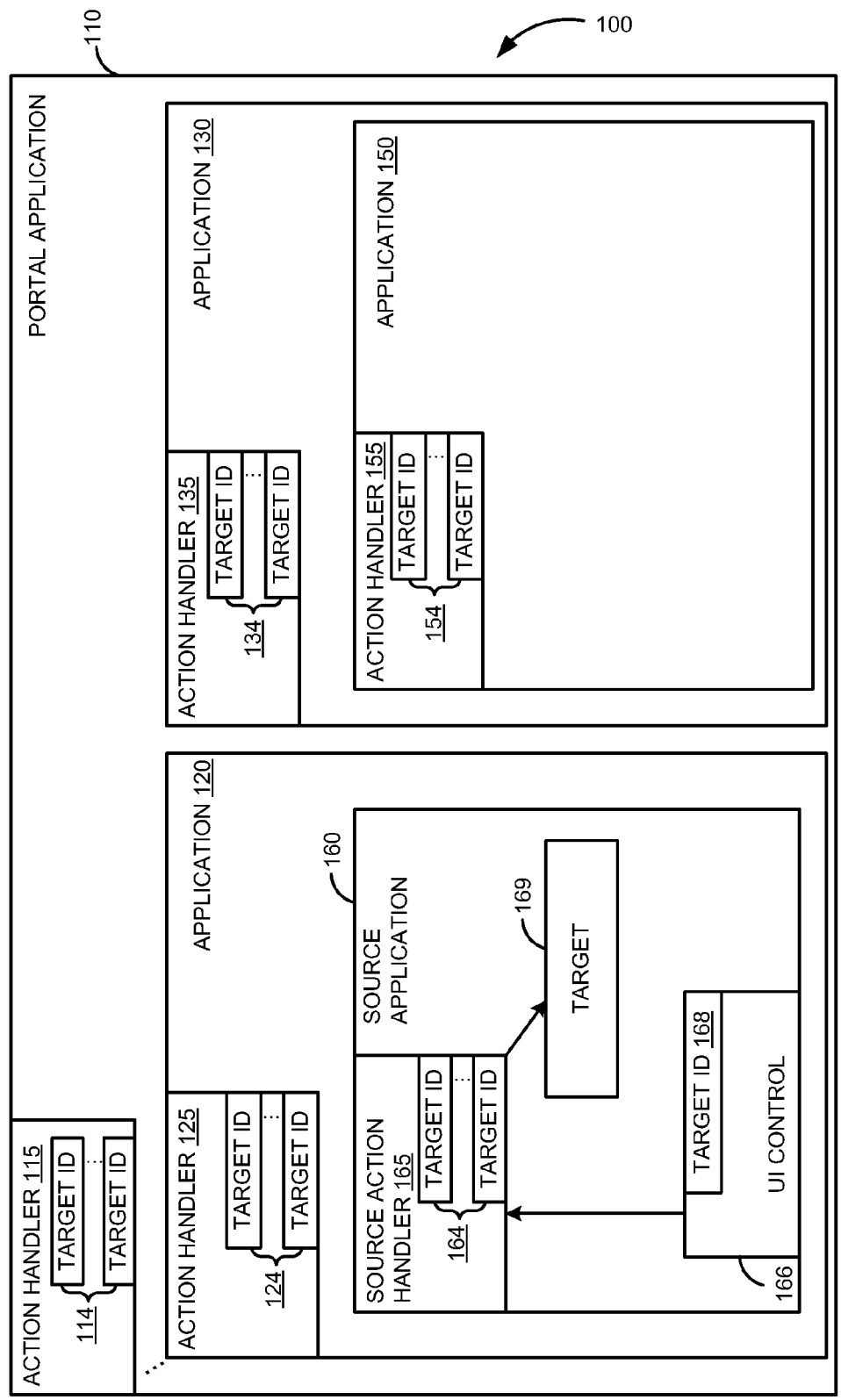
FIG. 1A is a block diagram illustrating a system for interaction between applications, according to one embodiment.

FIG. 1A is a block diagram of system 100 for interaction between applications built on different technologies, according to one embodiment. The system 100 includes an exemplary set of applications 110, 120, 130, 150 and 160 that are built on different UI technologies and are part of an integration scenario. More precisely, in FIG. 1A, blocks 110, 120, 130, 150 and 160 illustrate the UI layer of the applications. Each application is associated with at least one action handler. For example, in FIG. 1A, portal application 110 is associated with action handler 115, application 120 with action handler 125, application 130 with action handler 135, application 150 with action handler 155 and source application 160 with source action handler 165.

An action handler is associated with an application to implement the UI technology of the associated application. In one embodiment, action handlers may even be associated with separate UI components, e.g. browser windows, of a given application. In many cases, an action handler is associated with a UI exposed by an application. Alternatively, an action handler may also be associated with several applications built on the same UI technology. Thus, the association between action handlers and applications may be based on the UI technologies these applications implement. In one embodiment, an action handler may be implemented as a JavaScript® object within a browser. In other embodiments, action handlers may be created using other scripting or programming languages, such as, Java®, C/C++, Delphi®, ABAP®, HTML, ActionScript® originally developed by Macromedia Inc·, etc.

In this document, the term application is generally used to mean any software entity. The group of applications involved in a given integrated scenario may include, but is not limited to, applications such as enterprise software (e.g. Enterprise Performance Management (EPM), Governance, Risk and Compliance (GRC), Customer Relationship Management (CRM), Supply Chain Management (SCM) software, etc.), content access software (e.g. Web browsers, Media Players, etc.), data management software (e.g. Spreadsheets), etc.

In one embodiment, action handlers associated with a number of integrated applications are organized in a graph structure, where the nodes of the graph structure represent action handlers, and the edges of the graph represent relationships between the action handlers. In one embodiment, the graph structure may be a hierarchical tree. Action handlers may be linked with each other by parent-child relationships. There may be at least one root action handler at the top level of the hierarchy that does not have a parent action handler. In FIG. 1A, action handler 115 of portal application 110 is at the top level of the hierarchy, while action handlers 115, 125, 135, 155 and 165 are organized at lower levels.

In FIG. 1A, each set of target identifiers (IDs) 114, 124, 134, 154 and 164 is associated with a corresponding action handler from the group of action handlers 115, 125, 135, 155 and 165. Target identifiers uniquely specify targets within a given integration scenario. In this document, the term "target" may refer to a UI component, to a group of UI components, to the whole UI of an application or to the UI of several applications. In one embodiment, a target identifier is represented as uniform resource locator (URL), however, other formats may be used as well. Once a target identifier is generated for a given target, the target identifier is registered with an action handler implementing the UI technology of the target. As a result of a registration process, the action handler stores or keeps reference to the target identifier. Thus, a correlation between the target identifier and the action handler is established. In one embodiment, an action handler may store or keep reference to a set of correlations between target identifiers and corresponding action handlers, e.g., a set of pairs, where one element of a pair is a target identifier specifying a target UI component and the other is an action handler correlated with that target. In FIG. 1A, each action handler from the group of action handlers 115, 125, 135, 155 and 165 stores or keeps reference to a set of target identifiers 114, 124, 134, 154 and 164.

In one embodiment, a user triggers an access request from source application 160 to target 169, e.g, by clicking on UI control 166. The access request to a target application may be invoked by following a link in the source application to the target application, by clicking on a button, by activating other UI components, and the like. In one embodiment, access request means any type of contact between two applications built on different UI technologies. For example, an access request may be a request for navigation from one application to another, for accessing one application from another, for executing functions of one application from another or other types of interaction between applications.

Referring back to FIG. 1A, target identifier 168 is stored by control 166, generated for 169 by 160 or defined at design time. It uniquely specifies target 169. The target identifier 168 is retrieved and passed to the source action handler 165 responsible for processing the request. Thus, the access request is dispatched to source action handler 165 associated with the source application 160. Then, the source action handler checks whether target identifier 168 is a member of the set of target identifiers 164 associated with source action handler 165.

As shown in FIG. 1A, the target 169 is associated with source action handler 165. Respectively, the requested target 169 and the source application 160 are built on the same UI technology, and the target identifier 168 is a member of the set of target identifiers 164. Therefore, the source action handler 165 is responsible for implementing the UI technology of target 169, e.g., for launching the UI specified by target ID 168 of the requested target 169. In this document, the phrase "launching a target" may refer to executing, activating, bringing into focus, accessing or other types of actions with the target.

In one embodiment, the requested target application and the source application may have different action handlers associated with them. For instance, in FIG. 1B, target 178 is not implemented using the same UI technology as source application 160 where the access request is triggered. The source action handler 165 does not implement the same UI technology as target 178 of target application 170. Therefore, target identifier 167 of target 178 is not registered with source action handler 165 and is not a member of set of target identifiers 164 associated with source action handler 165. Thus, the source action handler cannot launch the requested target 178.

When no match for target identifier 167 is found in set 164, the access request is dispatched to the parent action handler 145 of the source action handler 165. The source action handler 165 dispatches the request to the related action handler on a higher hierarchical level. The action handler 145 checks whether target identifier 167 is included in its set of registered target identifiers 144. In the scenario illustrated in FIG. 1B, the UI technology of target 178 is different from the UI technology on which application 140 is built, and hence not associated with action handler 145. Therefore, target identifier 167 is not a member of set of target identifiers 144. Similarly, the request is dispatched upwards along the hierarchy of action handlers until a match is found. The request may reach the top level action handler 115, i.e. the root action handler. In one embodiment, the root action handler 115 stores or keeps reference to all target identifiers generated in system 100. In the integration scenario illustrated with FIG. 1B, the target identifier 167 is registered as a member of set of target identifiers 114 of the root action handler 115.

Action handler 115 dispatches the request to the respective action handler correlated with target identifier 167. In one embodiment, action handler 115 keeps reference to a correlation between the target identifier 167 and the immediate child action handler 135. Next, action handler 135 keeps reference to a correlation between target identifier 167 and the next child action handler 175 and so on. Thus, action handler 135 continues to dispatch the request downwards along the hierarchy of action handlers to target action handler 175, where target identifier 167 is member of set of target identifiers (IDs) 174. Finally, target action handler 175 launches target 178. The action handlers 115 and 135 dispatch the access request downwards the hierarchy of related action handlers until the request reaches action handler directly correlated with the target 178.

In another embodiment, when the request reaches an action handler that keeps reference to the requested target identifier, instead of dispatching the request downwards along the hierarchy of action handlers, the action handler dispatches the request directly to the action handler implementing the UI technology on which the target is built on. For example, in FIG. 1B, action handler 115 may store correlation between target identifier 167 and target action handler 175. Thus, the root action handler 115 may dispatch the request directly to target action handler 175 to launch target 178 of target application 170, skipping the dispatch of the request via action handler 135.

In yet another embodiment, the target identifier of the requested target application may not be correlated with any of the action handlers. In such a case, a negative response indicating access failure is delivered back to the action handler associated with the source application where the access request has been triggered. It could be a responsibility of the source application to manage the failure of the request.

In some cases, applications involved in a given integration scenario may be predefined and configured at design time. Alternatively, the involved applications are dynamically defined at run time. For example, the top level frame applications may be dynamically allocated by integration scenarios, while the organization of applications at lower levels of the hierarchy may be defined at design time.

Figure 2:
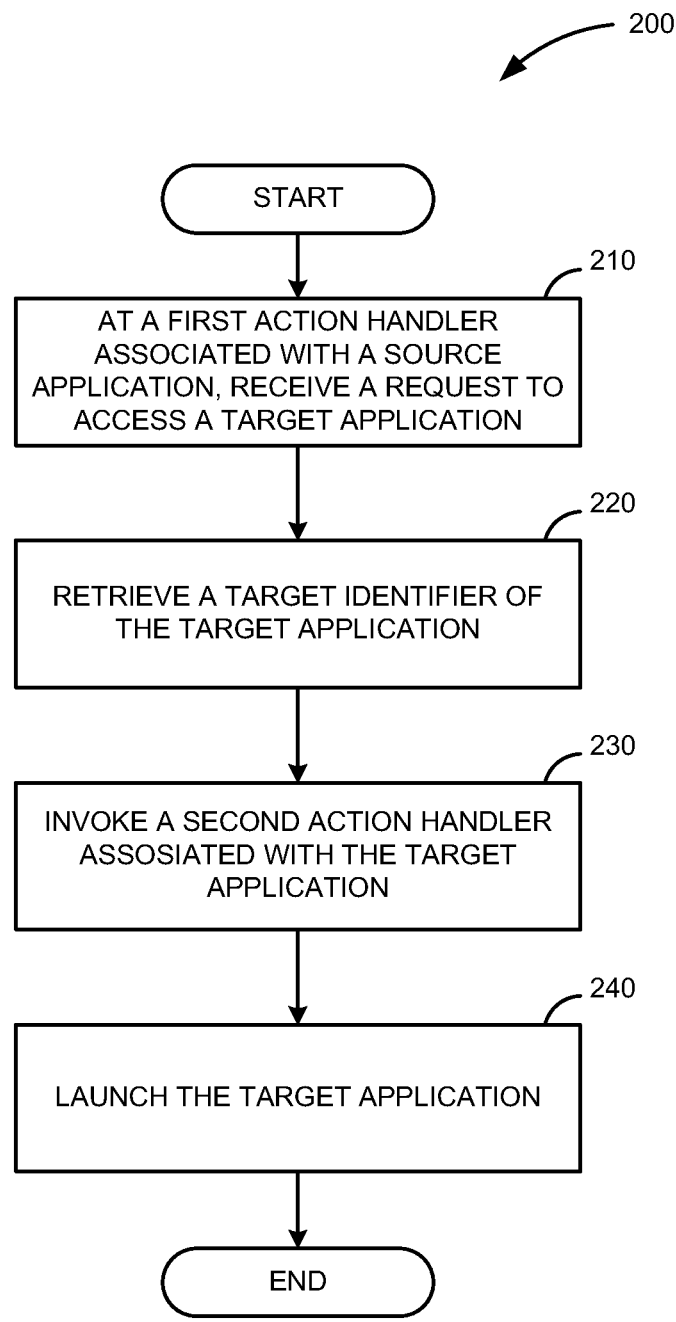
FIG. 2 is a flow diagram illustrating a method for interaction between applications built on different technologies, according to one embodiment.

FIG. 2 is a flow diagram illustrating process 200 for interaction between applications built on different UI technologies, according to one embodiment. The method starts at 210 with receiving a request to access a target application of a group of applications. The request is received at a first action handler associated with a source application of the group of applications. In one embodiment, a user renders the access request by selecting a UI control for navigation to the target application. The ability of applications, that are built on different UI technologies, to interact on UI level is necessary for providing uniform interface to these applications, such as consistent browser frame, UI portal, etc. Users are able to utilize a group of different applications, through a single access point, where the inefficiency of working with different UIs is overcome.

At 220, a target identifier of the target application is retrieved or generated based on the access request. The target identifier may be a URL. In one embodiment, a target URL consists of two parts—a target unique identifier (UID) and parameters. The target UID is a non-changing part of the target identifier that uniquely specifies a target within a given integration scenario. For example, a target UID may be "http://uri.sap.com/targets/poa/epm/ssm/planning/dashboard?". The second part of a target URL is used to pass parameters. For example, the parameters part of the target URL may be "client=200&mashup=budgeting". The target URL may be a concatenation of the target UID followed by the parameters, e.g. "http://uri.sap.com/targets/poa/epm/ssm/planning/dashboard?client=200&mashup=budgeting". In one embodiment, target identifiers that are represented by URLs may identify distinct entities within a given integration scenario.

At 230, in one embodiment, a second action handler that is associated with the target application is invoked, where the target identifier, retrieved at 220, is registered with the second action handler. A target identifier is associated with an action handler because the respective target can be launched by the action handler. Finally, at 240, the second action handler launches the target application in response to the request.

In one embodiment, the target identifier may be registered with the source action handler. Thus, the source action handler implements the UI technology of the requested target. As a result, instead of invoking a second action handler, the source action handler launches the target.

In one embodiment, the second action handler implementing the UI technology of the target application is invoked by a third action handler. In one embodiment, action handlers are organized in a hierarchical structure. The third action handler is at a higher level than the second action handler in the hierarchy of action handlers and stores or keeps reference to a correlation between the target identifier of the requested target and the second action handler. Before the request reaches the second action handler, it is first dispatched to the third action handler. For example, in FIG. 1B, the third action handler may be action handler 135 parent of the second action handler, i.e. target action handler 175. In yet another embodiment, the third action handler may be the root action handler, e.g. in FIG. 1B that is action handler 115 at the top level of the hierarchy of action handlers. The third action handler may be either parent, child, or not directly related to the first action handler, according to one embodiment.

Figure 3:
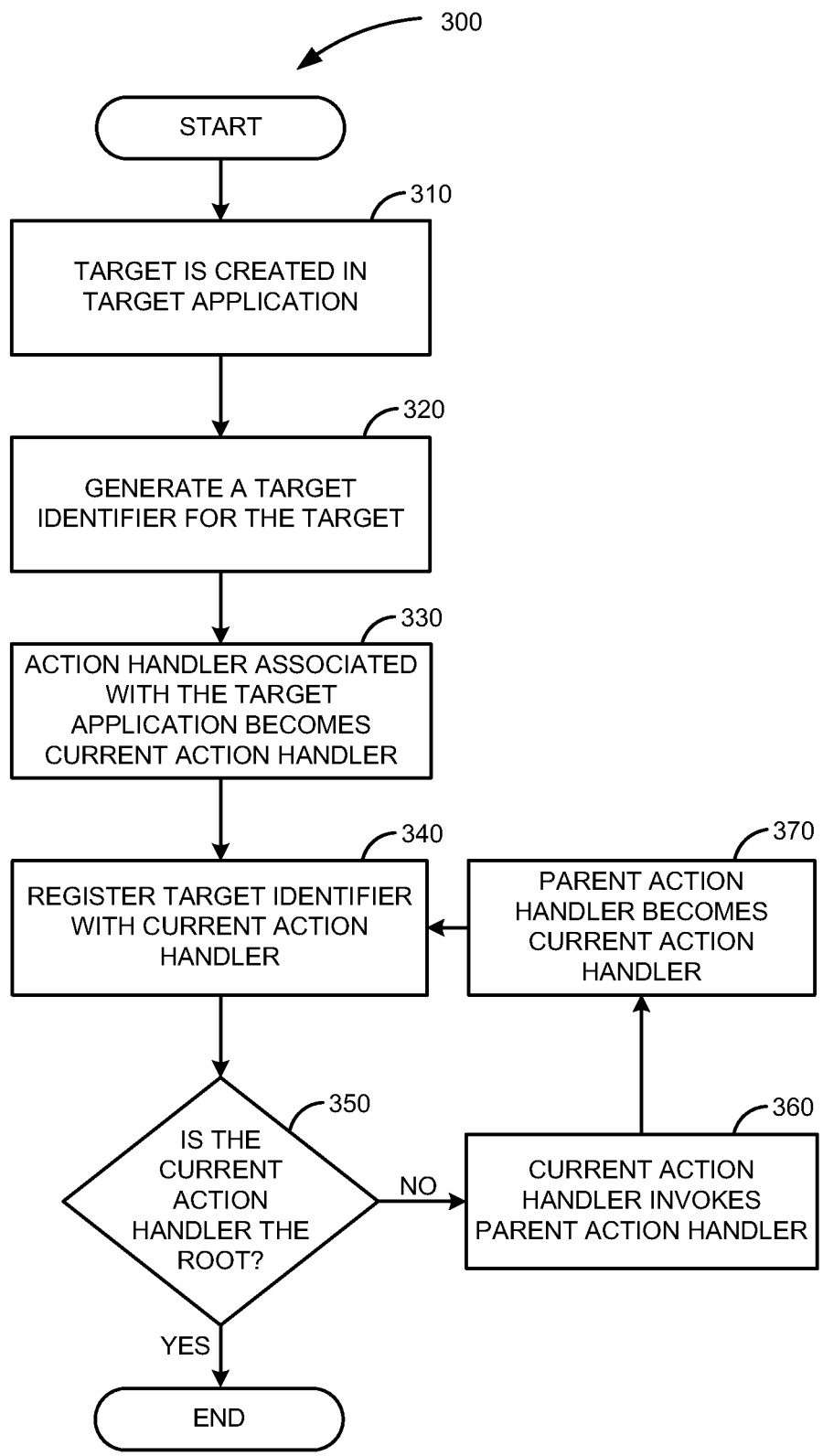
FIG. 3 is a flow diagram illustrating a method for target registration, according to one embodiment.

FIG. 3 is a flow diagram illustrating process 300 for target registration, according to one embodiment. The method starts at 310 with the creation of a target, where the creation occurs within a target application. At 320, a target identifier for that target is generated. At 330, the action handler associated with the target application becomes the current action handler. At 340, the generated target identifier is registered with current action handler. At 350, a check is performed whether the current action handler is a root action handler. In case the current action handler is not a root action handler, at 360, the current action handler invokes its parent action handler. At 370, the parent action handler becomes the current action handler. Then the process repeats, the target identifier is registered with the parent action handler. The process ends after 350 if the current action handler is root action handler.

In one embodiment, at 340, not only the target identifier is registered with the current action handler, but also the correlation between the target identifier and its respective action handler associated with the target application. For example, in FIG. 1B, when target 178 is created and the target registration process 300 is started (FIG. 3), firstly, target action handler 175 registers the correlation between itself and target identifier 167. Next, the correlation between target action handler 175 and target identifier 167 is registered with action handler 135. Similarly, this process continues until the correlation between target action handler 175 and target identifier 167 is registered with the root action handler 115.

In one embodiment, apart from registering the target identifier with the action handler of the target application at 340, the correlation between the target identifier and the last action handler the target identifier has been registered with is stored. Thus, track of the registration process is kept by a sequence of action handlers. Organizing action handlers in a hierarchy allows for a simplified launch of the target, e.g., by invoking action handlers one by one from the sequence of action handlers with which the target identifier has been registered.

Figure 1B:
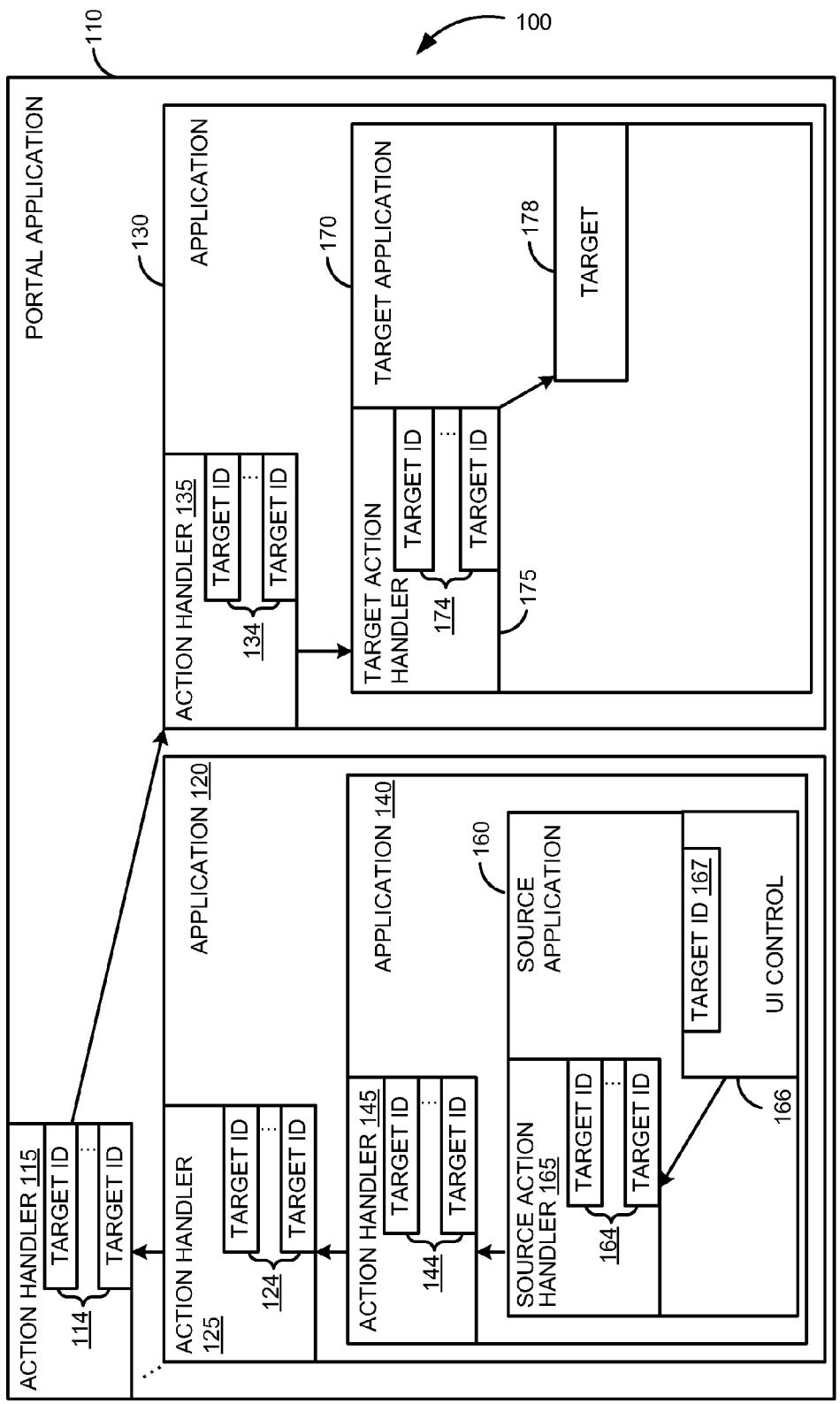
FIG. 1B is a block diagram illustrating a system for interaction between applications built on different UI technologies, according to one embodiment.

For example, in FIG. 1B, the correlation between target identifier 167 and target action handler 175 is registered with target action handler 175. Then, the correlation between target identifier 167 and target action handler 175 is registered with action handler 135. Finally, the correlation between target identifier 167 and action handler 135 is registered with action handler 115. Upon completion of the registration process, parent action handlers store information about target identifiers that are associated with their child action handlers. Moreover, parent action handlers store information about correlations between their child action handlers and the target identifiers. Target identifiers are distributed along the hierarchy of action handlers, where only root action handlers, at the top of the hierarchy, store information about all available target identifiers.

In one embodiment, the information may be stored in a hash table, where the key is the target identifier and the corresponding value for that key is the action handler associated with the target identifier. In another embodiment, an action handler may store the information in two-dimensional array of strings.

The target registration process 300 illustrated in FIG. 3 may be static, i.e. the registration of target identifiers may be performed at design or configuration time. For example, references to the relevant target identifiers may be embedded into action handlers at design time. Target identifiers may be stored locally by action handlers and predefined based on the technological limitations of the underlying platforms. Furthermore, action handlers may be organized in a hierarchy at design time as well.

In the same time, or alternatively, registration process may be dynamic. In other words, upon start-up of a scenario where the UIs of participating applications require integration, one or more of the applications involved in the scenario perform an initial process for registration of target identifiers. For example, in one embodiment, a bottom-up registration process is performed along the tree hierarchy of action handlers by action handlers associated with target applications. As a result, target identifiers are stored and distributed across subtrees of the hierarchical tree structure of action handlers, where only root action handlers keep reference to all target identifiers and their correlated action handlers. In case when a new target is presented in, or an existing target is removed from an application involved in the integrated scenario, the corresponding action handlers may dynamically register the newly created or remove the obsolete target identifiers.

In one embodiment, a target identifier refers to an already existing target that is already created and present in a given integration scenario. However, the functionality of the applications involved in an integration scenario, may allow dynamic creation of objects, e.g., dynamically created business objects, application windows, etc. For example, a dynamically generated browser window, displaying an instance of an object may be generated in response to an instantiation of the object. Thus, new targets might be dynamically created at run time. Target identifiers for such new targets may not be necessarily generated or assigned to those targets. In other words, the introduction of new targets into the system may not be automatically reflected into the hierarchy of action handlers by respective target identifiers distributed across the hierarchy. Furthermore, there may be requests for accessing, or navigating to targets, which are not yet created or present in the hierarchy of action handlers.

In one embodiment, a target identifier is constructed to identify not only a specific target, but also the host application of that target (i.e. the application within which the target is generated or present). As mentioned before in paragraph [0033], a target identifier may be URL string with two parts—a target UID and parameters. Based on the target UID, the host application of the requested target may be identified. The parameters part of the URL may be used to specify a particular entity to be accessed within the host application. In other words, the combination of a host application identifier and an identifier of a particular application object requested may represent a target identifier. The advantage is that upon receiving an access request, only the identifier of the host application is sufficient for action handlers to dispatch the request appropriately. Thus, a request to a target not yet created is dispatched to the appropriate host application based on the target identifier. Once the request is dispatched to the respective host application, the host application dynamically creates the target based on the parameters passed with the target identifier. This is how requests for navigation to, or other interactions, with dynamically generated objects are enabled, according to one embodiment.

For example, in FIG. 1B, an access request to a specific object (for instance with an object identifier "KPI8") within target application 170 is received upon activating UI control 166. Consequently, target identifier 167 is retrieved from the request, for example, "http://sap.com/application/150?objectid=kpi8". In case the requested target 178 is not yet created, the generated target identifier 167 is not present in the system yet, e.g., the retrieved target identifier 167 is not registered with any action handler yet. Nevertheless, the request is dispatched along the chain of action handlers until it reaches the root action handler 115.

In one embodiment, a general reference to target application 170 and the objects thereof may be registered with action handlers 175, 135 and 115. For example, the reference may be a URL string with wildcards or placeholders, such as "http://sap.com/application/150?objectid=*". Thus, once the request reaches the top level action handler 115 and set of target identifiers 114 is searched for target identifier 167, a match between the target identifier 167 and the reference to the host application 170 would be found. Consequently, the top level action handler dispatches the request accordingly first to action handler 135 and then to the target action handler 175 responsible for launching the specific object, i.e. target 178.

Figure 4A:
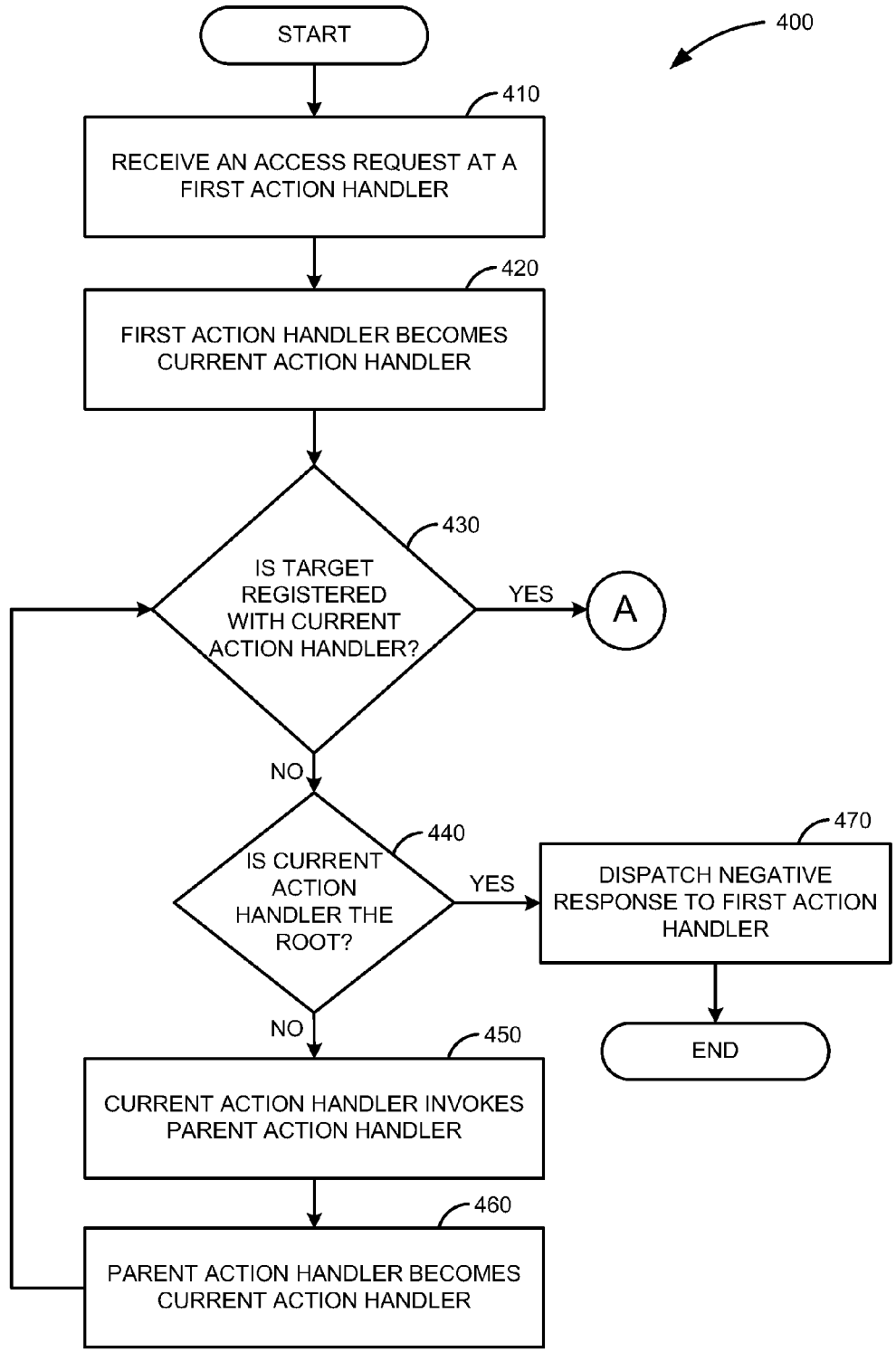
FIG. 4A is a flow diagram illustrating a method for dispatching an access request upwards along a hierarchy of action handlers, according to one embodiment.
Figure 4B:
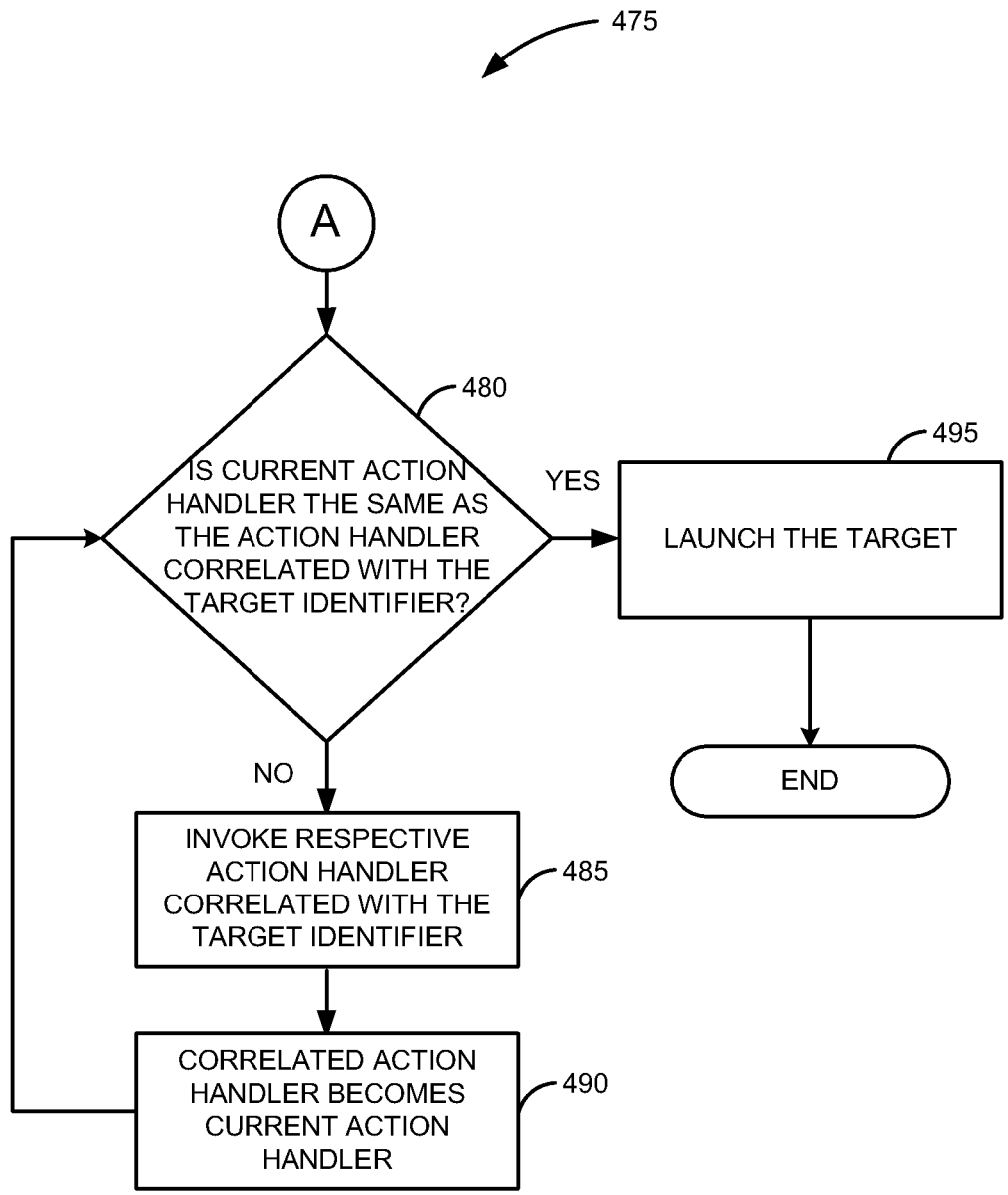
FIG. 4B is a flow diagram illustrating a method for dispatching an access request downwards along a hierarchy of action handlers, according to one embodiment.

FIG. 4A is a flow diagram illustrating process 400 for dispatching an access request along a hierarchy of action handlers, according to one embodiment. The method starts at 410 where an access request is received at a first action handler of a number of action handlers. At 420, the first action handler becomes the current action handler responsible for managing the request. At 430, the target identifier of the requested target is compared to target identifiers registered with the current action handler. In case no match is found, at 440, a check is performed whether the current action handler is root action handler. If the current action handler is root action handler, at 470, a negative response is dispatched to the first action handler and the process ends. It may be a responsibility of the application associated with the first action handler to manage the access request failure, e.g., to display an error message. If the current action handler is not a root action handler, at 450, the current action handler invokes its parent action handler. At 460, the parent action handler becomes the current action handler. The process 400 continues with dispatching the request along the child-parent relationships between action handlers until a match is found at block 430. Subsequently, once a match is found, i.e. if the current action handler stores or keeps reference to the target identifier of the requested target, the process 400 continues with dispatching the access request along the hierarchy of action handlers, according to one embodiment, as illustrated with process 475 in FIG. 4B. In another embodiment, once a match is found, instead of dispatching the request downwards along the tree hierarchy of action handlers, the current action handler dispatches the request directly to the target action handler, which in turn launches the requested target.

At 480, a check is performed whether the current action handler is the same as the action handler correlated with the target identifier of the requested target. If the check is confirmed, at 495, the current action handler launches the target and the process ends. Alternatively, if the current action handler and the correlated action handler are different, at 485, the current action handler invokes the action handler correlated with the target identifier. At 490, the invoked correlated action handler becomes current action handler and the process continues at 480.

Figure 5:
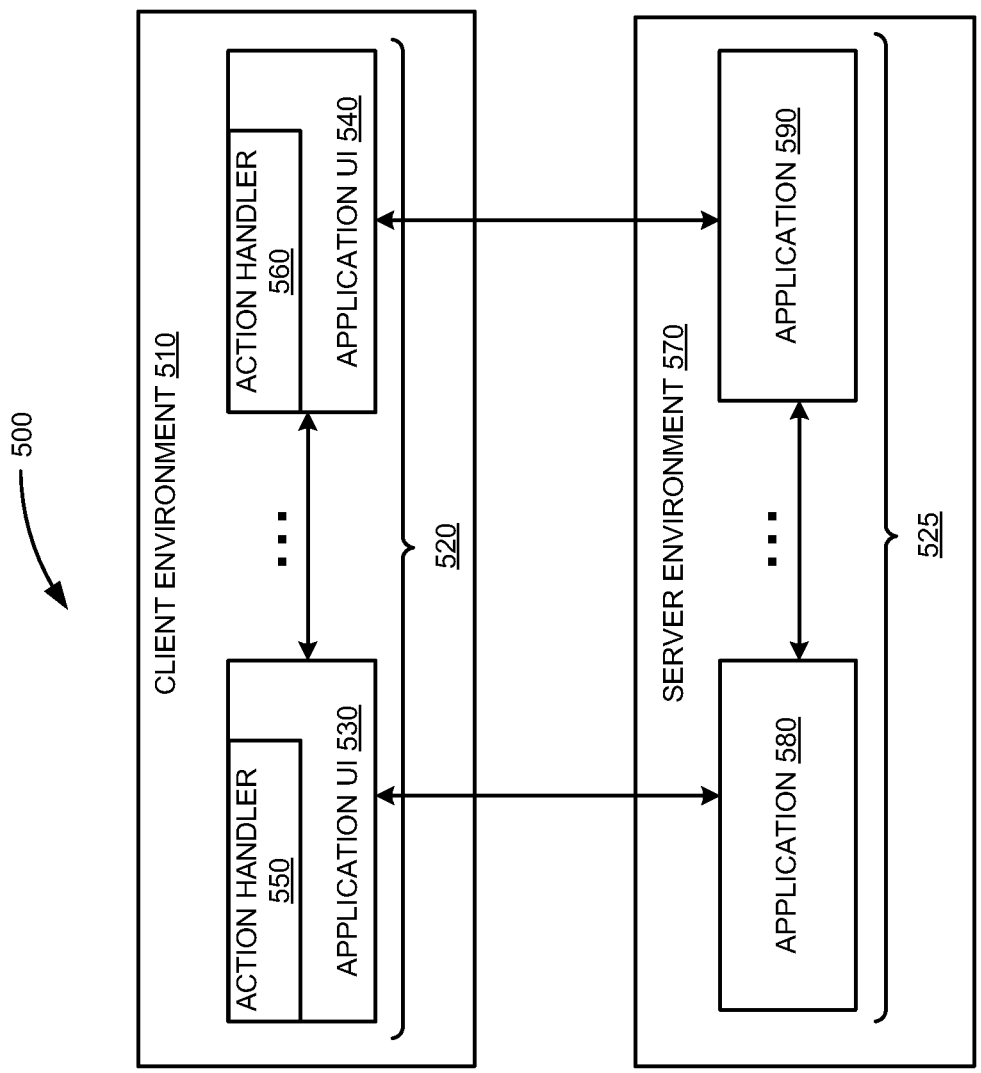
FIG. 5 is a block diagram illustrating an exemplary system for interaction between applications that are distributed across a client-server environment, the applications built on different technologies, according to one embodiment.

FIG. 5 is a block diagram illustrating system 500 for navigation across applications built on different technologies. In one embodiment, system 500 includes a number of applications 525 that communicate with each other in server environment 570, as well as their respective UIs 520, which may reside in the client environment 510. UI objects may be generated and managed in server environment 570 and displayed in client environment 510. Applications 525 may interact and communicate with each other in server environment 570, though interaction in the client environment 510 between the UIs 520 of applications 525 may be required as well. Action handlers 550-560 are introduced to facilitate navigation and interaction between the UIs 520 of applications 525. Action handler 550 is associated with UI 530 of application 580, and action handler 560 is associated with UI 540 of application 590.

As mentioned above in the background, communication bridges enable bi-directional communication between two different UI technologies. The method and system for navigation across applications built on different technologies described in FIG. 1 and FIG. 2 necessitate communication between action handlers in both directions. Thus, once a communication bridge is employed between two action handlers associated in a parent-child relationship, both action handlers may initiate communication.

On the other hand, the method for target registration illustrated in FIG. 3, in one embodiment, may require communication in one direction only. For example, bottom-up communication, i.e. child action handlers initiate registration with parent action handlers.

Several advantages are added by the method and system described herein. Firstly, communication bridges do not automatically allow navigation and interaction between UIs of two applications built on different technologies. Dispatching access requests and managing distribution of target identifiers is enabled by action handlers and their organization into a hierarchy.

Secondly, navigation, access or other interaction requests from one application to another are facilitated by dispatching the requests along parent-child associations of action handlers. In one embodiment, in the hierarchy, the path from one action handler to another action handler is unique. Thus, the method for accessing the UI of one application from another is simplified and improved compared with the association of each application with every other application from the integration scenario, where multiple paths may be used to navigate between the applications.

The embodiments of methods and systems for interaction between applications built on different UI technologies described herein further enable management of several instances of the same application. Each parent action handler keeps track of running instances of child action handlers. Thus, upon receiving an access request, an action handler may launch a new instance or an already existing running instance of an application. Depending on applications' functionalities several windows with different instances of a same object may be launched. Alternatively, only one window with one instance of a same object may be launched in parallel.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
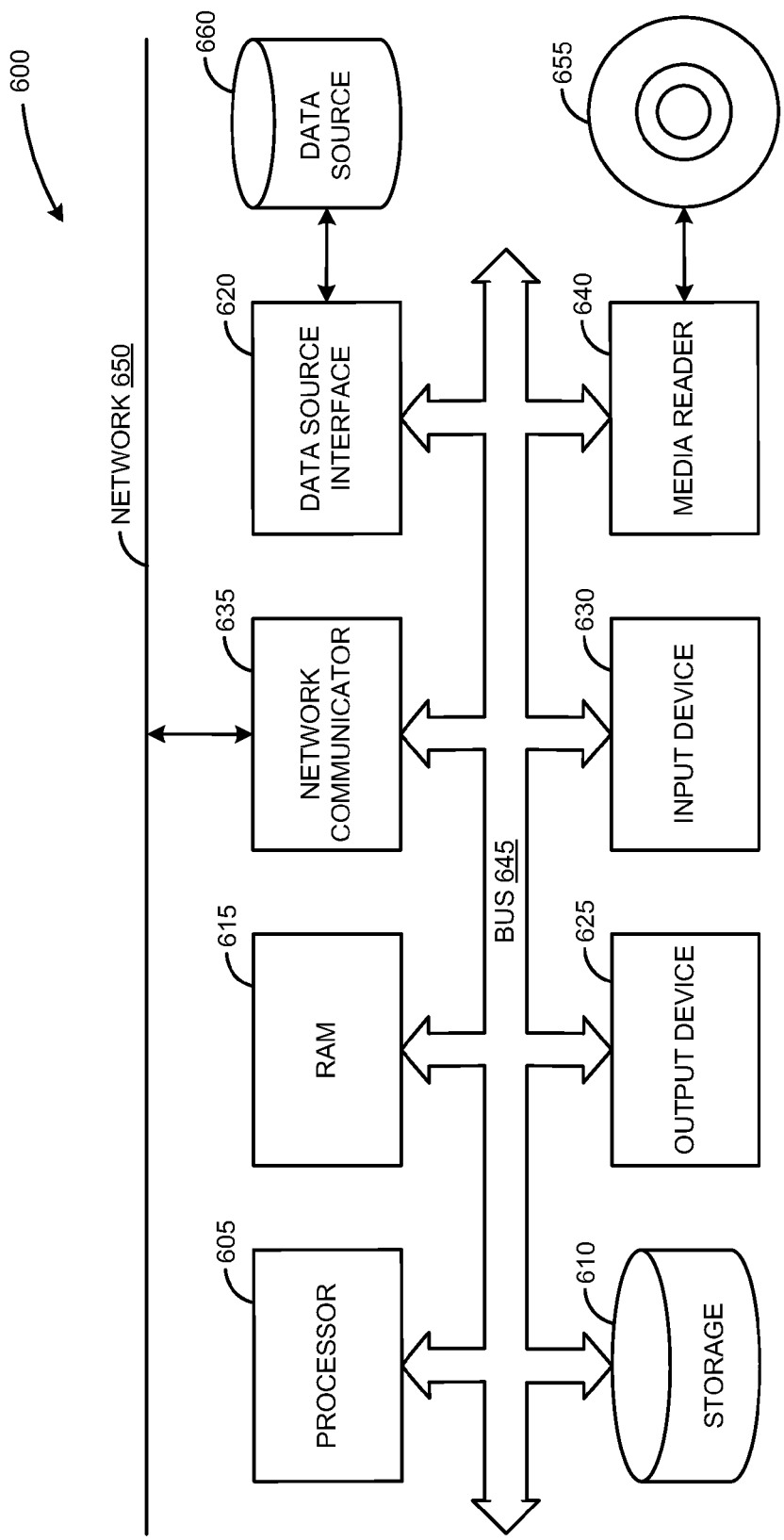
FIG. 6 is block diagram illustrating a computing environment in which the techniques described for interaction between applications built on different technologies can be implemented, according to one embodiment.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computerized method for interaction between a plurality of applications, the method comprising:
at a first action handler of a plurality of action handlers that services source application of the plurality of applications, receiving a request to launch a user interface (UI) component of a target application of the plurality of applications, wherein the first action handler services the source application to implement a first UI technology on which the source application is built and the first action handler is built on the first UI technology to permit UI navigation from the plurality of applications to the source application;
retrieving a target identifier of the UI component of the target application based on the request;
determining that the target identifier of the UI component is registered with a second action handler that services the target application, wherein the second action handler services the target application to implement a second UI technology on which the target application is built, the second UI technology is different from the first UI technology and the second action handler is built on the second UI technology to permit UI navigation from the plurality of applications to the serviced target application;
dispatching the request from the first action handler to the second action handler; and
launching the UI component of the target application by the second action handler in response to dispatching the request from the first action handler to the second action handler.

2. The method of claim 1, further comprising:
associating at least one application of the plurality of applications with at least one action handler of the plurality of action handlers, wherein the association is based on a same UI technology of the at least one application and the at least one action handler.

3. The method of claim 1 further comprising:
generating a parameter value for the request at the source application; and
passing the parameter value to the second action handler.

4. The method of claim 1, wherein dispatching the request from the first action handler to the second action handler further comprises:
dispatching the request from the first action handler to a third action handler that is a parent of the first action handler to determine whether the third action handler stores a correlation between the target identifier and another action handler of the plurality of action handlers;
determining that the third action handler stores a correlation between the target identifier and the second action handler; and
upon determining that the third action handler stores the correlation between the target identifier and the second action handler, dispatching the request from the third action handler to the second action handler.

5. The method of claim 1 further comprising:
organizing the plurality of action handlers into a hierarchical structure, wherein a third action handler keeps a reference to the second action handler and the second action handler is subordinate to the third action handler.

6. The method of claim 2, wherein associating the at least one application of the plurality of applications with the at least one action handler of the plurality of action handlers further comprises:
rendering the second action handler to implement the second UI technology of the target application, and
associating the second action handler with the target application.

7. The method of claim 1, wherein retrieving the target identifier comprises:
receiving a uniform resource locator assigned to the UI component of the target application.

8. The method of claim 1, wherein receiving the request comprises:
receiving a selection of a user interface control for navigation to the UI component of the target application.

9. A computer system for navigation between a plurality of applications, the system including:
at least one processor and memory for executing program code, the program code comprising:
a first action handler of a plurality of action handlers that services a source application of the plurality of applications, the first action handler to receive a navigation request to launch a UI component of a target application of the plurality of applications, wherein the first action handler services the source application to implement a first UI technology on which the source application is built and the first action handler is built on the first UI technology to permit UI navigation from the plurality of applications to the source application;
a target identifier of the UI component of the target application, wherein the target identifier is retrieved based on the request and the target identifier is registered with a second action handler;
the second action handler of the plurality of action handlers services the target application, wherein the second action handler services the target application to implement a second UI technology on which the target application is built, the second UI technology is different from the first UI technology and the second action handler is built on the second UI technology to permit UI navigation from the plurality of applications to the target application; and
the second action handler to launch the UI component of the target application in response to the navigation request.

10. The computer system of claim 9, further comprising a third action handler, wherein the third action handler is a parent of the first action hander and the third action handler stores a correlation between the target identifier and the second action handler.

11. The computer system of claim 9, wherein the target identifier includes a uniform resource locator.

12. The computer system of claim 9 further comprising a user interface control to receive the navigation request.

13. A non-transitory computer readable storage medium to tangibly store instructions, which when executed by a computer, cause the computer to perform operations comprising:
at a first action handler of a plurality of action handlers that services a source application of a plurality of applications, receiving a request to launch a user interface (UI) component of a target application of the plurality of applications, wherein the first action handler services the source application to implement a first UI technology on which the source application is built and the first action handler is built on the first UI technology to permit UI navigation from the plurality of applications to the serviced source application;
retrieving a target identifier of the UI component of the target application based on the request;
determining that the target identifier of the UI component is registered with a second action handler, wherein the second action handler services the target application to implement a second UI technology on which the target application is built, the second UI technology is different from the first UI technology and the second action handler is built on the second UI technology to permit UI navigation from the plurality of applications to the serviced target application;
dispatching the request from the first action handler to the second action handler; and
launching the UI component of the target application by the second action handler in response to dispatching the request from the first action handler to the second action handler.

14. The non-transitory computer readable storage medium of claim 13, wherein the operations further comprises:
generating a parameter value for the request at the source application; and
passing the parameter value to the second action handler.

15. The non-transitory computer readable storage medium of claim 13, wherein dispatching the request from the first action handler to the second action handler further comprises:
dispatching the request from the first action handler to a third action handler that is a parent of the first action handler to determine whether the third action handler stores a correlation between the target identifier and another action handler of the plurality of action handlers;
determining that the third action handler stores a correlation between the target identifier and the second action handler; and
upon determining that the third action handler stores the correlation between the target identifier and the second action handler, dispatching the request from the third action handler to the second action handler.

16. The non-transitory computer readable storage medium of claim 13, wherein the operations further comprises:

associating the plurality of action handlers into a hierarchical structure, wherein a third action handler keeps a reference to the second action and the second action handler is subordinate to the third action handler.

17. The non-transitory computer readable storage medium of claim 13, wherein the operations further comprises:
   rendering the second action handler to implement the second UI technology of the serviced target application.

18. The non-transitory computer readable storage medium of claim 13, wherein retrieving the target identifier comprises:
   receiving a uniform resource locator assigned to the UI component of the target application.

19. The non-transitory computer readable storage medium of claim 13, wherein receiving the request comprises:
   receiving a selection of a user interface control for navigation to the UI component of the serviced target application.

\* \* \* \* \*